United States Patent [19]

LaFleur et al.

[11] Patent Number: 5,322,892

[45] Date of Patent: * Jun. 21, 1994

[54] FIBER-FORMING PROCESS FROM POLYMERIC BLENDS

[75] Inventors: Edward E. LaFleur, Warminster; Robert M. Amici, Doylestown; William J. Work, Huntington Valley, all of Pa.

[73] Assignee: Rohm and Haas Company, Philadelphia, Pa.

[ * ] Notice: The portion of the term of this patent subsequent to Feb. 23, 2010 has been disclaimed.

[21] Appl. No.: 981,570

[22] Filed: Nov. 25, 1992

Related U.S. Application Data

[63] Continuation of Ser. No. 781,715, Oct. 22, 1991, Pat. No. 5,189,097, which is a continuation-in-part of Ser. No. 623,864, Dec. 7, 1990, abandoned.

[51] Int. Cl.5 .............................................. C08G 63/48
[52] U.S. Cl. ....................... 525/57; 525/58; 525/100; 525/103; 525/205; 364/177; 364/178; 364/185
[58] Field of Search ................. 525/57, 100, 103, 205, 525/58; 364/177, 178, 185, DIG. 8, DIG. 26, DIG. 29

[56] References Cited

U.S. PATENT DOCUMENTS

| 3,105,058 | 9/1963 | Osugi et al. | 260/45 |
| 3,425,979 | 2/1979 | Monaghan et al. | 260/332 |
| 3,595,740 | 7/1971 | Gerow | 161/254 |
| 4,464,438 | 8/1984 | Lu | 428/515 |
| 4,481,326 | 11/1984 | Sonenstein | 525/57 |
| 4,600,746 | 7/1986 | Schmukler et al. | 524/381 |
| 4,656,216 | 4/1987 | Muller et al. | 524/381 |
| 4,666,763 | 5/1987 | King et al. | 428/357 |
| 4,741,969 | 5/1988 | Hayama et al. | 428/514 |
| 4,866,122 | 12/1989 | Gerlowski et al. | 525/38 |
| 4,900,764 | 2/1990 | Highgate et al. | 525/100 |
| 4,904,509 | 2/1990 | Nohara et al. | 525/57 |
| 4,921,907 | 5/1990 | Negi et al. | 525/57 |
| 5,057,368 | 10/1991 | Largman et al. | 428/397 |

FOREIGN PATENT DOCUMENTS 373911 12/1989 European Pat. Off. .
1330745 9/1973 United Kingdom .

Primary Examiner—Melvyn I. Marquis
Assistant Examiner—Randy Gulakowski
Attorney, Agent, or Firm—Roger K. Graham

[57] ABSTRACT

A melt process for forming fibers from blends of polymers containing a high percentage of vinyl alcohol units with terpolymers of alkyl methacrylates, unsaturated acids, anhydrides or glycidyl-containing esters, and N-vinyllactams or N-vinylamides is described.

2 Claims, No Drawings

FIBER-FORMING PROCESS FROM POLYMERIC BLENDS

This is a continuation of application Ser. No. 781,715, filed Oct. 22, 1991, now U.S. Pat. No. 5,189,097 which is a continuation in part of Ser. No. 623,864, filed Dec. 7, 1990, now abandoned.

FIELD OF THE INVENTION

This invention relates to blends, especially melt-processable blends, of polymers containing a high percentage of vinyl alcohol units blended with certain copolymers of alkyl methacrylates with N-vinyllactams or N-vinylamides. It further relates to blends, especially melt-processed blends of these polymers in the form of sheet, film, fibers and other formed objects which exhibit an useful balance of barrier and strength properties, such as good resistance to permeation of gases, low moisture absorptivity, and toughness/modulus balance adequate for packaging uses. Further improvements in processing and properties are seen when the copolymer additive further contains units derived from a copolymerized acid or anhydride monomer.

BACKGROUND OF THE INVENTION

Of all the synthetic polymers considered as materials with useful gas permeation properties, such as resistance to passage of oxygen, carbon dioxide, water, and the like, poly(vinyl alcohol) (PVOH), a polymer made up of units of the structure

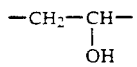

and generally prepared by the total hydrolysis of homopolymers of vinyl acetate and related vinyl esters, the starting polymer made up of units of the structure

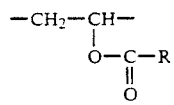

where R is H or $-(CH_2)_m-CH_3$ and m is 0 to 7, preferably 0, ranks as the most impervious to the passage of small molecules. PVOH derives this property from the high cohesive energy density and polarity of the hydroxy groups. The presence of the network of hydroxy groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded.

The above limitations were surmounted by the preparation and subsequent hydrolysis of vinyl acetate copolymers with monomers other than vinyl esters, especially copolymers with olefins, such as ethylene, propylene, butene-1, and the like. Hydrolysis of ethylene/vinyl acetate copolymers provides a polymer which exhibits those desirable characteristics of PVOH, but is superior to PVOH in performance in hydrophilic environments, such as wet strength, and in melt processability. However, these copolymers exhibit a significant increase in the permeability of the polymer to small molecules. Polymers having a low mol percentage of ethylene, such as from about 5 to about 25 mol percent, are similar to poly(vinyl alcohol) in that they cannot be melt-processed into film without the aid of plasticizers.

In order to render PVOH melt processable, steps have been taken to break up the crystallinity by the addition of external plasticizers. Amongst the best known plasticizers of PVOH are the polyols; these include polyethylene glycol, glycerol, and neopentyl glycol. The use of small molecules or oligomers as plasticizers for PVOH has its inherent limitations and disadvantages. The current state of the art technology employs 10–25 parts of plasticizer to 100 parts of PVOH. A higher concentration of plasticizer leads to phase separation and embrittlement of the plasticized matrix. Low levels of plasticizer, on the other hand, lead to the formation of highly viscous inextrudable melts during melt processing and extrusion. Another shortcoming of plasticized PVOH is the occurrence of plasticizer migration, which arises during thermal processing such as extrusion and heat sealing of PVOH film. During extrusion, the low molecular weight plasticizer may deposit at the die lips. During heat sealing, the low molecular weight plasticizer will migrate and evaporate from the heated region of the film. In the absence of the plasticizer, the PVOH rapidly recrystallizes and embrittles the heat sealed portion of the film. In a packaging application, this embrittlement can compromise the integrity of the package via cracks and pinholes. Another shortcoming of externally plasticized PVOH, which manifests itself when the plasticized PVOH resin comes into contact with alkaline or acidic solvents, is the hydrolysis and subsequent embrittlement of the partially hydrolyzed PVOH resin that is frequently used in preparing plasticized PVOH material.

Preparation of internally plasticized PVOH resin by polymerization of vinyl acetate in the presence of a plasticizer or second polymer has been studied to overcome the above difficulties, but such polymerizations, especially in emulsion, offer limitations caused by the difficulty of dispersing the plasticizer or pre-formed second polymer where it is intimately admixed with the polymerizing vinyl ester, which has a significant degree of water solubility.

In spite of the fact that all of the above mentioned techniques have the effect of improving the melt processing characteristics of PVOH, they also have the concomitant effects of significantly increasing the permeability of the resin to small molecules and reducing the stiffness and heat distortion temperature of the resin. Thus there exists a need for a means to allow melt-processing of polymers of high vinyl alcohol content, such as fully hydrolyzed or highly hydrolyzed polymers of vinyl esters, into useful objects maintaining most of the barrier properties of the polymer of high vinyl alcohol content. There further exists a need for additive polymers which may be blended with polymers of high vinyl alcohol content to enhance their ability to form films and coatings with improved properties of the film or coating without much loss in barrier properties.

In European Unexamined Patent Application 373,911 are disclosed, among many others, blends of (a) copolymers of poly($C_1$–$C_4$) alkyl methacrylates with N-vinylpyrrolidone, it being taught that such copolymers could optionally contain (meth)acrylic acid, with (b) polymers and copolymers containing at least 50 mol percent of vinyl alcohol mers (equivalent to the present description of polymers containing units of the structure

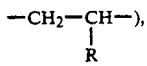

the amounts of (a) and (b) in the blend being 20 to 95% by weight and 2.5 to about 40% by weight respectively. These specific blends of the European Application are directed towards improved barrier properties of the acrylic polymer, thus the high ratio of (a) to (b).

SUMMARY OF THE INVENTION

We have found that blends of polymers having at least 50 mol percent of vinyl alcohol units, the remaining being vinyl ester residues, with a second copolymer of $C_1$-$C_4$ alkyl esters of (meth)acrylic acid with N-vinyllactams with 4, 5, 6 or 7 membered rings or with N-vinylamides provide compositions having an attractive balance of optical properties, strength/toughness values, and barrier properties. We have further found that a melt-processable polymeric blend comprising (a) from about 50 to about 90 parts of a first polymer comprising at least about 50 mol percent to at least about 95 mol percent of units of the structure

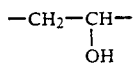

and from about 5 mol percent to about 50 mol percent of units of the structure

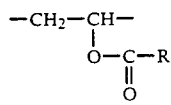

and/or about 5 to about 15 mol percent of units of

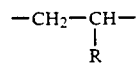

where R is H or —($-CH_2$)$_m$—$CH_3$, and where m is 0 to 7 and/or

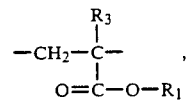

where $R_1$ is an alkyleneoxy group, and $R_3$ is H or $CH_3$, and (b) from about 10 to about 50 parts of a second polymer comprising from about 5 to about 35 weight of units of the structure

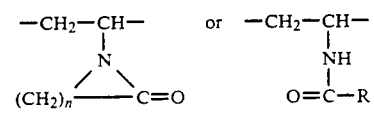

where n is 2, 3, 4 or 5, and from about 65 to about 95 weight percent of units derived from a $C_1$ to $C_4$ alkyl ester of (meth)acrylic acid, may be formed into useful objects such as sheet, film, and the like having useful barrier properties. We have further found that useful objects having similar attractive properties may be formed from a melt-processable polymeric blend comprising a) from about 50 to about 90 parts of a first polymer comprising at least about 95 mol percent of units of the structure

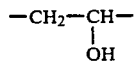

and less than about 5 mol percent of units of the structure

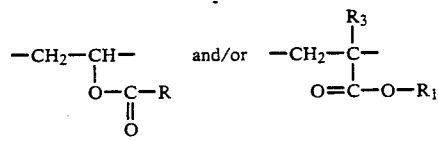

where R is H or —($-CH_2$)$_m$—$CH_3$, and where m is 0 to 7, and where $R_3$ is $CH_3$ or H, and $R_1$ is an alkyleneoxy group with (b) from about 10 to about 50 parts of a second polymer comprising from about 25 to about 95 weight percent of units of the structure

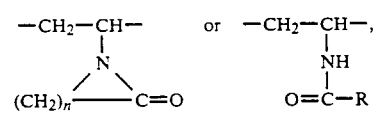

where n is 2, 3, 4 or 5, and from about 5 to about 75 weight percent of units derived from a $C_1$ to $C_4$ alkyl ester of (meth)acrylic acid.

We have further found that improvements may be made in the melt-processing of such blends when the second polymer also contains from about 1 to about 10 weight percent of units derived from an unsaturated copolymerizable organic acid. The presence of the copolymerized acid units enlarges the range of compositions of useful additive polymers containing amide or cyclic amide units and (meth)acrylate ester units which produce melt-processable blends.

Thus, we have found that a polymeric blend comprising from about 50 to about 90 parts of a first polymer containing units of the structure

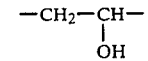

and optionally units of the structure

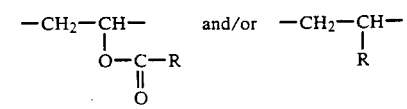

where R is H or —($-CH_2$)$_m$—$CH_3$, and where m is 0 to 7, and from about 10 to about 50 parts of a second polymer containing from about 5 to about 95 parts of units of the structure

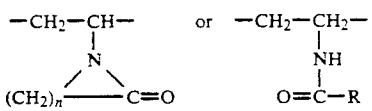

where n is 2, 3, 4, or 5, from about 94 to about 4 parts of units of the structure

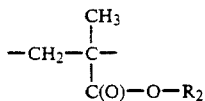

where $R_2$ is $C_1$-$C_4$ alkyl, and from about 1 to about 10 parts of a copolymerizable unsaturated acid, may be melt-processed into useful objects such as sheet, film, and fiber.

We further have found that blending of the two polymers by melt-mixing will form a segmented polymer comprising at least one segment of a first polymer containing at least 50 mol percent of units of the structure

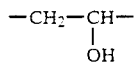

and optionally units of the structure

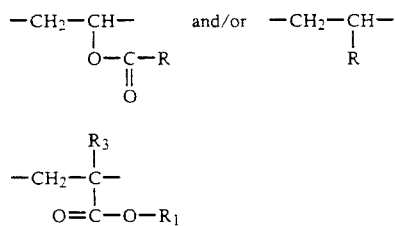

where R is H or —$(CH_2)_m$—$CH_3$, and where m is 0 to 7, where $R_1$ is an alkyleneoxy group, and where $R_3$ is H or $CH_3$, and chemically joined or grafted thereto at least one segment of a second polymer containing from about 5 to about 95 parts by weight of units of the structure

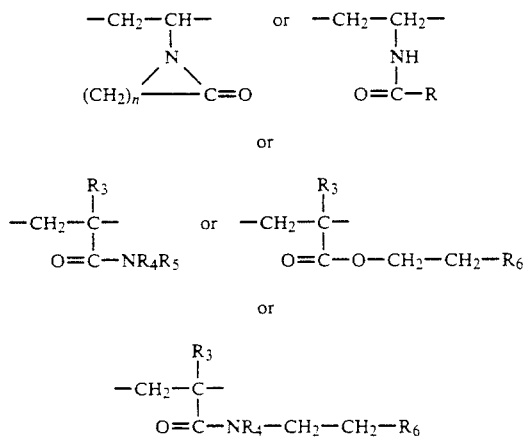

where n is 2, 3, 4, or 5 and $R_4$, $R_5$, and $R_6$ are defined below, about 94 to about 4 parts by weight of units of the structure

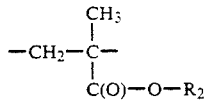

where $R_2$ is $C_1$-$C_4$ alkyl, and from about 1 to about 10 parts of units derived from a copolymerizable unsaturated acid. It is preferred, for the purposes of this invention, that the first segment polymer is from about 50 to about 90 parts by weight of the segmented copolymer.

DETAILED DESCRIPTION OF THE INVENTION

The blends of the vinyl alcohol polymers and the (meth)acrylate/vinyllactam polymers may be formed into useful objects by many techniques, including casting from solution, compression molding of powder blends, formation of films and sheets from mixtures of latices and water-soluble polymers, extrusion of melt blends, and the like. The scope of the invention is not limited by the means of processing.

However, not all combinations of the two polymer classes can be melt processed. By melt-processable is meant that the polymer or blend can be converted from a solid form such as pellets, powder, and the like into a viscoelastic melt within an extruder or other heating-/mixing device, that the melt is thermally stable enough to resist thermal degradation, and that the melt can be processed by extrusion, calendering, laminating, molding and the like into useful objects. The melt will neither be so liquid that it cannot be contained within the extruder or cannot be issued from the extruder in solid form, nor will it be so viscous that the extruder is incapable of processing it without damage to the equipment, nor will it be so thermally unstable that degradation will spoil the appearance or physical properties of objects processed from the melt. Further, the melt and resulting extrudate must be uniform in appearance.

The first polymer of the blend, which we shall designate PVOH, is a homopolymer or a copolymer of "vinyl alcohol" and a vinyl ester. Vinyl alcohol does not exist in monomeric form, and polymers containing such units must perforce be derived by chemical alteration of polymers derived from another monomer. The most common means of preparing such polymers is to polymerize a vinyl ester, such as vinyl formate, vinyl acetate, and the like of the structure

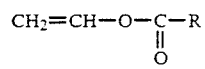

where R is H or —$(CH_2)_m$—$CH_3$, where m is from 0 to 7. Especially preferred is vinyl acetate, where R is —$(CH_2)_m$—$CH_3$ and m=0. Such polymers may be almost completely saponified or hydrolyzed to form polymers of greater than 99 mol % "vinyl alcohol". A small number of

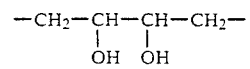

repeat units may be present. By controlling the conditions of hydrolysis or saponification, copolymers of the vinyl ester and vinyl alcohol may be formed. A range of such compositions are commercially available. The range of from about 50 mol % to about 100 mol % of vinyl alcohol is encompassed in the invention. Other co-monomers may be present in the first polymer, but at low molar levels, such as below about 10 mol %. Such co-monomers may include (meth)acrylic esters, such as alkyl esters, such as ethyl acrylate, butyl methacrylate, and the like, hydroxyalkyl (meth)acrylates, such as beta-hydroxyethyl methacrylate, and the like, olefins, such as ethylene, propylene, butene-1 and the like, vinyl halides, such as vinyl chloride, N-vinyllactams, maleic anhydride, dialkyl maleates, dialkyl fumarates, and the like. As noted, most commercial copolymers of ethylene and vinyl alcohol, having a relatively low mol % of vinyl alcohol content and diminished barrier properties, are unsuitable for the purposes of the present invention; however, copolymers of from about 5 to about 25 mol percent ethylene, preferably from about 5 to about 15 mol percent, may be melt-processed when blended with the copolymers of lower alkyl (meth)acrylates disclosed herein.

The partially or totally hydrolyzed PVOH employed in this invention possess a molecular weight (weight average) between 13,000 and 186,000, but preferably between 31,000 and 50,000. The viscosity of these two ranges of average molecular weights may also be measured in solution, and will vary from 3-50 cPs (4% aqueous solutions, 20° C.), preferably between 22-26 cPs. If PVOH of a lower degree of saponification (50-87 mol %) is utilized, the polymer may be of higher molecular weight.

The first polymer may also contain units derived from alkyleneoxy (meth)acrylates, such as are described in U.S. Pat. No. 4,618,648, incorporated herein by reference. Such alkyleneoxy (meth)acrylates are esters of (meth)acrylic acid having as the "alcohol" portion oligomers of —CH$_2$—CHY—O units, where Y is hydrogen or methyl, and are derived from oligomerization of ethylene and/or propylene oxide. They may be terminated at one end by alkyl, aryl, or alkaryl groups, such as $C_1$-$C_{20}$ alkyl, $C_6$ aryl or $C_7$-$C_{20}$ alkaryl group.

The second component of the melt-processable blend is a polymer which is a copolymer of from about 5 to 95 parts of a $C_1$ to $C_4$ alkyl ester of acrylic or methacrylic acid, preferably the $C_1$ ester of methacrylic acid, which is methyl methacrylate, with from about 95 to about 5 parts of a N-vinyllactam, that is, a monomer of the structure

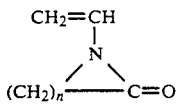

where n is 2, 3, or 4. Such monomers include N-vinylpropiolactam, N-vinylpyrrolidone (otherwise known as N-vinylbutyrolactam), and N-vinylcaprolactam. Preferred is the lactam wherein n=3, which is N-vinylpyrrolidone (NVP), for reasons of commercial availability. Methyl methacrylate (MMA) is preferred because it endows the copolymer with a higher service temperature and a higher degree of polarity for best compatibility with the PVOH.

The vinyllactams may be replaced in part or completely by monomers of the structure $$CH_2=C(R_3)-CO-NR_4R_5$$

where $R_3$ is H or $CH_3$, $R_4$ and $R_5$ may be the same or different and are H, $C_1$-$C_4$ alkyl, or —$C_2H_4$—(O—$C_2H_4$)— in a cyclic form. They may further be replaced in part or completely by monomers of the structure $$CH_2=C(R_3)-C(O)O-CH_2-CH_2-R_6$$

or $$CH_2=C(R_3)-C(O)NR_4-CH_2-CH_2-R_6$$

where $R_6$ is a urea or cyclic ureido structure of the formula $$-NH-CO-NHR_1$$

or

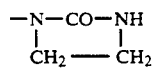

They may further be replaced in part or completely by monomers of the structure $$CH_2=CH-NH-C(O)-R$$

such as N-vinylacetamide and the like.

It is preferred that the second copolymer further contain from about 1 to about 10 parts of units derived from at least one copolymerizable unsaturated acid. Contemplated are acids such as carboxylic acids, sulfonic acids, phosphonic acids, and the like, such as those incorporated from monomers such as p-vinylbenzenesulfonic acid, beta-methacryloxyethylphosphonic acid, methacrylic acid, and the like.

A preferred blend composition comprises a) from about 70 to about 90 parts of the first polymer wherein the first polymer contains more than about 85 mole percent of units of the structure

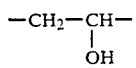

and less than about 15 mol percent of units of the structure

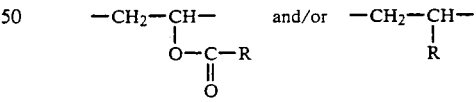

[where R is —H or —(—CH$_2$)$_m$—CH$_3$ and where R is —(—CH$_2$)$_m$—CH$_3$, m is 0], b) from about 10 to about 30 parts of the second polymer containing from about 5 to about 35 parts of units of the structure

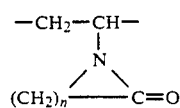

where n is 3, from about 60 to about 94 parts of units of the structure

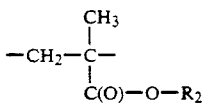

where $R_2$ is —$CH_3$, and from about 1 to about 5 parts of a copolymerizable unsaturated acid wherein the acid is methacrylic acid, acrylic acid, itaconic acid, maleic acid, fumaric acid, acryloxypropionic acid, or alpha-methylene-delta-methylglutaric acid. Of the acids, especially preferred for cost and ease of incorporation, is methacrylic acid.

Other monomers may be copolymerized with those listed above which comprise the second copolymer, as long as they do not adversely affect either the copolymerization behavior, the processing of the blends, or the physical properties of the blend. Such monomers include up to about 10 parts of vinyl esters, such as vinyl acetate, vinyl aromatics, such as styrene, other esters of (meth)acrylic acid, such as glycidyl methacrylate, 2-ethylhexyl acrylate, and the like, (meth)acrylonitrile, and the like.

It is believed that when the acid group is present in the second copolymer that a chemical reaction occurs with the poly(vinyl alcohol) to produce a segmented copolymer of the structure described above. A preferred embodiment of this segmented copolymer comprises a segmented copolymer wherein the trunk contains more than about 85 mol percent of units of the structure

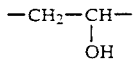

and less than about 15 mol percent of units of the structure

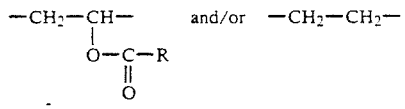

where R is —(—$CH_2$)$_m$—$CH_3$, and where m is 0, wherein the grafted or side-chain polymer contains from about 5 to about 35 parts by weight of units of the structure

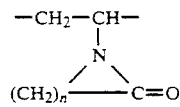

where n is 3, about 94 to about 64 parts by weight of units of the structure

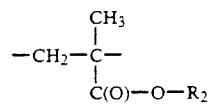

where $R_2$ is —$CH_3$, and from about 1 to about 5 parts of units derived from methacrylic acid, and wherein the trunk polymer is from about 70 to about 90 parts by weight of the graft copolymer.

The extent of grafting may be enhanced by the presence of catalysts for esterification reactions between acid or anhydride groups and alcohol groups, or by catalysts for reaction of epoxy groups with acid groups. Such catalysts may include acids, bases, organotin catalysts, organotitanium catalysts, and the like. The esterification reaction may be enhanced also by removal of water formed during the grafting reaction, such as by vacuum application to the reactor, such as a vacuum vent on the extruder.

The second copolymer may be prepared by any of methods known to the art, such as in bulk, suspension, solution, and the like. Preferred for ease of polymerization, availability of higher molecular weights, and ease of isolating into powdery form, is emulsion polymerization. The weight-average molecular weight of the second polymer may vary from about 10,000 to about 500,000; preferred for ease of processing, thermal stability, and rheological properties is from about 100,000 to about 200,000. However, when the second polymer contains units derived from an unsaturated acid and when the first polymer is of relatively high molecular weight, the preferred molecular weight range of the second polymer is from about 10,000 to about 100,000. By following the experimental procedures described below, the skilled practitioner can readily determine if appropriate melt strength has been achieved without raising the melt viscosity to the extent that processing and extrusion are difficult.

A compositional range of from about 50 to about 90 parts of the first polymer and correspondingly from about 10 parts to about 50 parts of the second polymer is contemplated. In general, the lower the level of the second polymer required to achieve melt processability, the better will desirable PVOH properties, such as oxygen barrier, be maintained.

The presence in the second polymer of units derived from an unsaturated copolymerizable acid broadens the range of compositions which are useful in achieving the improvements desired in the processing and properties of the first polymer.

The system most thoroughly examined has been with a first polymer being a "homopolymeric" poly(vinyl alcohol) or a copolymer with relatively low levels of vinyl acetate, and the second polymer being a copolymer of methyl methacrylate and N-vinylpyrrolidone. If the acetate content of the PVOH is lower than 5 mol %, the final blend with a methacrylic copolymer, with N-vinyl pyrrolidone content of 5 to 25 weight percent (the remainder being methyl methacrylate), has a melting temperature that is in the vicinity of the degradation temperature. Melt stable blend compositions in which the acetate content of the PVOH is lower than 5 mol percent may be prepared with methacrylic copolymers (MMA-NVP) of N-vinyl pyrrolidone content ranging from 36-95% by weight and methyl methacrylate content ranging from 74 to 5% by weight. PVOH of a saponification degree that is higher than 95 mol %, yields blend compositions that show evidence of macroscopic phase separation and degradation when the acrylic copolymer (MMA-NVP) contains less than about 25% by weight of N-vinyl pyrrolidone; such blend compositions are thermally and rheologically unstable in the melt. Broader ranges of compositions of the two classes may be used if mixing and processing does not involve melt-processing.

When a copolymerizable unsaturated acid is polymerized with the lower alkyl (meth)acrylate and the lactam-containing monomer (or those amide or ureido-containing monomers which may replace the lactam monomer), the useful compositional range is widened, in that the resulting additive polymer shows broader utility with the first polymer, especially when the first polymer is a polymer which is mainly composed of units derived from vinyl alcohol. The amount of lactam-containing monomer in the second polymer may be varied over a wider range and the useful levels of the additive polymer may also be varied over a wider range. For this reason, such ternary additive polymers are preferred.

When the PVOH retains enough acetate groups to translate into a degree of saponification lower than 95 mol %. Then the second copolymer will contain from about 5 to about 35 parts of the N-vinyllactam monomer and from about 65 to about 95 parts of the (meth)acrylate ester. Preferred for this purpose as the first polymer is a copolymer of vinyl acetate hydrolyzed or saponified to a degree to retain from about 5 to about 13 mole % of vinyl acetate units. Such blends are suitable, for example, as water-dispersible films. However, for certain properties such as barrier to gases, it is preferred that first polymer be essentially fully hydrolyzed.

The (meth)acrylate copolymers used in this invention were prepared by emulsion polymerization of commercially available acrylic or methacrylic esters, such as methyl methacrylate, unsaturated acid, and NVP monomers. However, other suitably adapted polymerization methods such as solution, suspension, or bulk polymerization may also serve to prepare the copolymers.

As noted, when the second polymer contains units derived from an unsaturated acid, anhydride, or epoxy-group containing monomer, chemical attachment occurs between the first and second polymers. These chemically joined polymers are defined as segmented polymers, where at least one segment of the first polymer as defined above is chemically joined to at least one segment of the second polymer. Since both types of segment have, prior to chemically joining, more than one reactive group, at this stage of investigation, it is difficult to describe the structure of the segmented polymer in conventional "graft copolymer" terminology. Depending on the relative amounts of first and second polymers and the extent of reaction, it is difficult to state which polymer is the trunk and which the graft.

Graft copolymers with poly(vinyl alcohol) trunks and (meth)acrylate-based grafts or side chains have been known for many years, and may be prepared by use of cerium (+IV) catalysts to form radical sites on the poly(vinyl alcohol) and then to initiate polymerization of the (meth)acrylate monomers from these sites. However, it is believed the present segmented copolymers are novel.

Blending of the two copolymers may be carried out most conveniently by dry mixing the finely granulated polymer particles prior to melt compounding in a single- or twin-screw extruder. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents, coloring agents, fillers and other compounds. Further, fugitive plasticizers, such as water in amounts about 3%, may be added to aid in compounding and processing the blend.

The blends of the present invention, especially those which are melt-processable, are useful in many applications. When the vinyl alcohol polymer is water-soluble, a film from the blends can be broken down in water for ready disposal. Such blends in film form may also be useful as containers for toxic, corrosive, or skin-sensitizing chemicals which are to be used in water, such as agricultural chemicals to be sprayed. The blends in film form such as in blown film, are useful as high gas barrier films for packaging, especially of food. The films from the blends can be laminated onto substrates to form useful barrier structures for containment or packaging of food or beverages. The blends in container form, such as film, bottles, and the like may be used to exclude gases such as oxygen or to contain gases such as carbon dioxide. Blends with improved heat distortion properties may be useful in hot fill packaging or in retortable or sterilizable container packaging. The blends or laminates may also be useful in museum and other glazing where clarity and long-term retention of an inert atmosphere are desired. The blends may also be useful in bags for medical laundry, and for lamination of films to paper.

The blends of the present invention may be used to form useful fibers. The blends may be processed from the melt or from a solvent-swollen gel. The melt-processable blends may be passed through an appropriate die to form filaments which may be stranded into single or multi-stranded fibers of various thicknesses. The fibers may then be further processed into appropriate products, such as packaging materials, water-soluble disposable cloths, such as diapers and the like. The fibers may be post-treated after forming by chemicals which will insolubilize the poly(vinyl alcohol), and the resulting fibers may be processed into articles with high moisture uptake which do not dissolve in water. Further, the polymers may be spun by a solid state process wherein the fiber is oriented in the solid state to produce a fiber with a very high tensile modulus.

Films from the present blends may be laminated, co-extruded, or co-injection molded to form laminated structures with a good combination of clarity, toughness, and barrier properties. For example, a blend of a 3:1 methyl methacrylate/N-vinylpyrrolidone copolymer in admixture with poly(vinyl alcohol) in a 50//50 mixture may be co-extruded with poly(ethylene terephthalate) (PET), with poly(methyl methacrylate), with poly(vinyl chloride), or with polycarbonate, to form continuous laminated film with good adhesion between the layers. The co-extruded film with PET can be thermoformed into useful objects without delamination. The blend may be varied through other compositional ratios, such as 60//40 or 80//20, and other combinations of copolymer, poly(vinyl alcohol) and other polymer may be co-extruded using technology known to the art.

The acrylic copolymers (MMA-NVP or MMA-NVP-MAA) were prepared from commercially available MMA and NVP monomers by emulsion polymerization and isolated by a coagulation or freeze drying technique. The particular copolymers described in the examples may contain from 5-25 weight percent of NVP, the balance being MMA; from 0 to 10% methacrylic acid may be present. The presence of MAA has little effect on the polymerization reaction.

EXAMPLES

The following examples will illustrate the properties of the blend compositions. All compositions referred to in the examples are in weight percent or parts by weight unless otherwise specified. All compositions of the following examples were dry blended to yield homogeneous mixtures of finely divided particulates. In each case the mixture of fine white powder was melt compounded in a single screw Killion Extruder at temperatures ranging from 204°-222° C. and a screw speed of 80 rpm. The pellets derived from each of the above examples were evaluated on a system 90 Torque Rheometer for thermal and rheological stability. Each blend composition was tested under similar conditions of temperature (195° C.), rotor rate of 80 RPM and residence time of 30 minutes. The value of the 'stable torque' is derived from the torque versus time plot. This value occurs as a minimum and it characterizes the viscous nature of the melt. The high 'stable torque' value obtained for PVOH, alone may arise as a result of cross-linking which has the effect of rendering the resin inadequate for processing by current thermoplastic processing methods. The 'degradation time' and 'degradation rate' were measured by carefully observing the progressive discoloration of the sample and the eventual formation of charred particles during melt mixing in the bowl of the Torque Rheometer. The observation was facilitated by sampling the melt throughout the duration of the residence time. The 'degradation time' was taken as the time at which charred particles first began to appear. The 'degradation rate', on the other hand, was recorded as the slope of the torque versus time plot at the onset-time of degradation. Each of the blend compositions, and the base polymer PVOH, was analyzed by the capillary rheometer.

The test method used in the evaluation of the rheological characteristics of the base polymer and the blends is ASTM D3835-79, which provides the necessary correlation between actual processing conditions and the test conditions. The melt viscosity of the base resin, PVOH, is inadequate for such thermal processing applications as extrusion blow molding, coextrusion, thermoforming etc. To adequately satisfy the processing requirements, the resin should exhibit a non-Newtonian response, i.e. having a low viscosity under high shear conditions such as those encountered during extrusion and a high viscosity under the low shear conditions experienced by blow molded parisons and thermoformed articles. Consequently, the test method evaluates the thermal, rheological and shear stability of the molten polymer. The melt viscosity of the base polymers and blends was measured under the same temperatures and piston speed set conditions. Under a given set of shear rates, the viscosity of the base polymer, PVOH, is lower than that of the alloys.

The particular materials used in the examples were as follows:

a) PVOH-1 (from Air Products, commercially designated AIRVOL ®-523) is a partially hydrolyzed (87-89 mol %) resin having a solution viscosity of 22-26 cPs determined on a 4% aqueous solution at 20° C. The Mw of this PVOH is 85,000-146,000. PVOH-2 resin is Air Products AIRVOL ®-205 which is a partially hydrolyzed (87-89 mol %) resin possessing a solution viscosity of 5-6 cPs when determined on a 4% aqueous solution at 20° C.; it has a Mw of 31,000-50,000.

The acrylic copolymers (MMA-NVP or MMA-NVP-MAA) were prepared from commercially available MMA and NVP monomers by emulsion polymerization and isolated by a coagulation or freeze drying technique. The particular copolymers described in the examples may contain from 5-25 weight percent of NVP, the balance being MMA; from 0 to 10% methacrylic acid may be present. The presence of MAA has little effect on the polymerization reaction.

In Experiments 38 and following, Haake testing was conducted at 200° C., a rotor rate of 80 rpm, and a mixing time of ca. 30 minutes. Values of torque are plotted vs. time to determine the stable torque values. The time to char formation was also noted.

EXAMPLE 1

This example teaches the general method for preparing copolymers of methyl methacrylate and N-vinyl pyrrolidone. A copolymer comprising 25 weight percent of NVP and the remainder MMA was prepared by an emulsion polymerization technique as follows: A monomer mixture (Mix M) was prepared, having methyl methacrylate:N-vinyl pyrrolidone ratio of 75:25. The mixture contained 4237.5 grams of MMA, 1412.5 grams of NVP, 16.95 grams of N-dodecyl mercaptan, 3333.74 grams of deionized water and 105.94 grams of a 10% aqueous sodium dodecylbenzene sulfonate solution.

Each monomer mixture was polymerized according to the following procedure. To an appropriate glass vessel equipped with stirrer, heater, a reflux condenser, and nitrogen sparge tube, was added 7467.57 grams of deionized water, and 2.52 grams of sodium carbonate. The mixture was sparged for one hour with nitrogen while heating to 70° C. The sparge was then changed to a sweep and 317.81 grams of a 10% aqueous solution of sodium dodecylbenzene sulfonate was added to the mixture. The temperature of the reaction vessel was then raised to 85° C. At this temperature, 124.96 mL of the initiator mixture (Mix I, which consisted of 5.65 grams of sodium persulfate and 1618.86 grams of deionized water) was added to the reaction vessel. The monomer mixture (Mix M) was then into the reaction vessel over a time period of three hours.

As the polymerization proceeded, the initiator mixture was added to the reaction vessel at the rate of 124.96 mL every 15 minutes. The accumulation of solids was measured every 60 minutes just before the addition of the initiator mixture. At the completion of the initiator and monomer addition the mixture was held at 85° C. for one hour. The mixture was then cooled, filtered and the polymer isolated by freeze-drying. The initiator may also be added gradually throughout the reaction, with equivalent results.

EXAMPLES 2-7

The following examples (Table I) illustrate blends prepared from different PVOH and MMA/NVP polymers.

TABLE I

| COMPONENTS | Designation of MMA/NVP Polymer | Blends - Examples | | | | | |
|---|---|---|---|---|---|---|---|
| | | 2 | 3 | 4 | 5 | 6 | 7 |
| MMA-NVP (Mw = 79.2 K), | Ex. 1a | 20 | | | | | |
| MMA-NVP (Mw = 96.3 K) | Ex. 1b | | 20 | | | | |
| MMA-NVP (Mw = 111 K) | Ex. 1c | | | 20 | | | |

TABLE I-continued

| COMPONENTS | Designation of MMA/NVP Polymer | Blends - Examples 2 | 3 | 4 | 5 | 6 | 7 |
|---|---|---|---|---|---|---|---|
| MMA-NVP (Mw = 150 K) | Ex. 1d | | | | 20 | 20 | 50 |
| PVOH-1 | | 80 | 80 | 80 | 80 | | |
| PVOH-2 | | | | | | 80 | 50 |

Mixtures were prepared by dry-blending in a polyethylene bag to yield a mixture of a 80:20% weight ratio of PVOH to methyl methacrylate-co-N-vinyl pyrrolidone copolymer. The mixture was fed into the hopper of a single screw Killion extruder in which the mixture was melt compounded and extruded to form pellets at the following extrusion conditions: Extruder barrel temperatures: Zone-1: 204° C., Zone-2: 210° C., Zone-3: 216° C.; Die temperatures: die-1: 218° C., die-2: 221° C.; screw speed=80 rpm. Torque conditions are reported in Table II.

(Note: Example 7 is a 50:50 blend of MMA/NVP copolymer 1d and poly(vinyl alcohol) PVOH-2.) In a blend such as Example 5, about 3% of water may be added to the blend at the time of processing; the water may be removed at a vacuum vent on the extruder, and further may be removed by careful drying of the pellets prior to molding or extruding into useful objects.

TABLE II

| Blend Example | 2 | 3 | 4 | 7 | PVOH-1(control) |
|---|---|---|---|---|---|
| Stable torque (N · m) | 26 | 24 | 27 | 12 | 40 |
| Degradation time (sec.) | 488 | 569 | 530 | 1756 | 356 |
| Degradation rate (N · m/min) | 13 | 9 | 10 | 1 | 14 |

In all cases, the blends exhibit a lower "stable torque" value indicative of easier processing, and lower degradation times, indicative of improved thermal stability in the melt.

EXAMPLES 8-19

In these examples are further illustrated the conversion from unstable torque to stable torque when the unstable PVOH samples are blended with the MMA/NVP copolymers from Example 1. Two other PVOH commercial samples are introduced into this experiment. PVOH-3 is AIRVOL ®-165, a high range weight average molecular weight (Mw=124,000-186,000); Degree of saponification 99.3+mol %; Solution viscosity of 55-65 cPs (4% by weight, 20° C.). PVOH-4 is a poly(vinyl alcohol) obtained from Aldrich Chemical Co., of intermediate range weight average molecular weight (Mw=77,000-79,000); degree of saponification 88 mol %. All blends in this series are with MMA/NVP copolymer of Example 1d, or repeat preparations of slightly different molecular weight.

The terms 'Stable Melt' and 'Unstable Melt' (Table III) refer to the appearance of the melted PVOH or PVOH/'MMA/NVP copolymer blends. 'Stable Melt' indicates that the molten polymer or blend did not develop the coarse lumps that are indicative of degradation and crosslinking, nor did it exhibit the surface pattern known as "melt fracture" as it emerged from the extruder die. 'Unstable Melt' indicates a mixture of degradation, phase separation and cross-linking during the melt compounding and extrusion processes. The endothermic melting temperature ($T_m$) was determined by differential scanning calorimetry (DSC).

TABLE III

| EX. | POLYMER/BLEND | % COMP. (X:Y) | Tm (°C.) | THERMAL STABILITY |
|---|---|---|---|---|
| 8 | PVOH-3 | 100/00 | 220.5 | Unstable Melt |
| 9 | PVOH-2 | 100/00 | 167.1 | Unstable Melt |
| 10 | PVOH-1 | 100/00 | 158.3 | Unstable Melt |
| 11 | PVOH-4 | 100/00 | 151.3 | Unstable Melt |
| 6 | PVOH-1/Ex. 1d | 80/20 | 187.3 | Stable Melt |
| 7 | PVOH-2/Ex. 1d | 80/20 | 192.0 | Stable Melt |
| 12 | PVOH-3/Ex. 1d | 95/05 | 225.0 | Unstable Melt |
| 13 | PVOH-3/Ex. 1d | 90/10 | — | Unstable Melt |
| 14 | PVOH-3/Ex. 1d | 85/15 | 225.1 | Stable Melt |
| 15 | PVOH-3/Ex. 1d | 80/20 | 228.2 | Stable Melt |
| 16 | PVOH-3/Ex. 1d | 70/30 | 214.7 | Stable Melt |
| 17 | PVOH-3/Ex. 1d | 65/35 | 216.4 | Stable Melt |
| 18 | PVOH-4/Ex. 1d | 80/20 | 192.8 | Stable Melt |
| 19 | PVOH-4/Ex. 1d | 40/60 | 171.7 | Stable Melt |

EXAMPLES 20-34

These examples supply further indication of the range of compositions of PVOH and MMA/NVP useful in producing stable blends (Table IV). The other MMA/NVP copolymers were prepared by the process of Example 1; variations in the level of NVP were made to obtain the desired compositions. Variations in mercaptan were made to vary the molecular weights. PVOH-5 is AIRVOL ®-203, ultra low average molecular weight (Mw=13-23K); degree of saponification 87-89 mol %; solution viscosity of 3-4 cPs (4% by weight, aqueous solution at 20° C.).

TABLE IV

| EX. | POLYMER/BLEND (weight ratio) | Wt. % MMA/NVP in copolymer | MW of copolymer | Tm(°C.) | THERMAL STABILITY |
|---|---|---|---|---|---|
| 20 | PVOH-5 | | | 170.9 | Unstable Melt |
| 21. | PVOH-5/(MMA/NVP) (1:1) | 75/25 | ca.160 K | 177.4 | Stable Melt |
| 22. | PVOH-5/(MMA/NVP) (3:2) | 75/25 | " | 189.7 | Stable Melt |
| 23. | PVOH-2/(MMA/NVP) (1:1) | 75/25 | " | 169.3 | Stable Melt |
| 24. | PVOH-2/(MMA/NVP) (2:3) | 75/25 | " | 170.3 | Stable Melt |
| 25. | PVOH-2/(MMA/NVP) (4:1) | 95/05 | " | 179.3 | Stable Melt |
| 26. | PVOH-2/(MMA/NVP) (4:1) | 90/10 | " | 180.5 | Stable Melt |
| 27. | PVOH-2/(MMA/NVP) (4:1) | 85/15 | " | 180.9 | Stable Melt |
| 28. | PVOH-2/(MMA/NVP) (4:1) | 80/20 | " | 180.4 | Stable Melt |
| 29. | PVOH-2/(MMA/NVP) (4:1) | 75/25 | " | 181.9 | Stable Melt |

TABLE IV-continued

| EX. | POLYMER/BLEND (weight ratio) | Wt. % MMA/NVP in copolymer | MW of copolymer | Tm(°C.) | THERMAL STABILITY |
|---|---|---|---|---|---|
| 30. | PVOH-1/(MMA/NVP) (1:1) | 95/05 | 39 K | 165.8 | Stable Melt |
| 31. | PVOH-1/(MMA/NVP) (1:1) | 90/10 | " | 163.8 | Stable Melt |
| 32. | PVOH-1/(MMA/NVP) (1:1) | 85/15 | " | 181.5 | Stable Melt |
| 33. | PVOH-1/(MMA/NVP) (1:1) | 80/20 | " | 180.7 | Stable Melt |
| 34. | PVOH-1/(MMA/NVP) (1:1) | 75/25 | " | 178.3 | Stable Melt |

EXAMPLE 35

This example illustrates the effect on melt rheology (Table V) when blends of PVOH-1 or PVOH-2 and MMA/NVP (75/25 copolymer, MW 150,000 (Example 1d) are examined for melt viscosity vs. shear vs. the individual components of the blend. The results indicate a higher melt viscosity for the blends, both at low and high shear, which should result in a material less "soupy" in the melt and with more hot-strength upon processing into sheet or film. All values were obtained at 230° C.

ratio. The table further gives data for blends of PVOH-2 with a similar MMA/N-VP copolymer, the blends being in a 1:1 and 2:3 ratio.

Pellets obtained from the extrusion process were also compression molded into thin films (3–5 mils) for oxygen permeability tests, which were tested for oxygen permeability on a Mocon Ox-Tran 1000 unit, manufactured by Modern Controls, of Minneapolis, Minn. The films were mounted in the diffusion cells where they were first purged with nitrogen as a first step in establishing a base line. This was followed by exposing the upper surface of the film to an oxygen rich atmosphere

TABLE V

| EXAMPLE POLYMER/BLEND | SHEAR RATE (1/s) | VISCOSITY (Pa · s) |
|---|---|---|
| PVOH-1 (control) | 1.171E(01) | 2.778E(04) |
| | 3.778E(01) | 1.021E(04) |
| | 8.001E(01) | 6.186E(03) |
| | 2.027E(02) | 3.517E(03) |
| | 4.991E(02) | 1.355E(03) |
| | 1.093E(03) | 7.434E(02) |
| | 2.337E(03) | 3.863E(02) |
| | 4.674E(03) | 2.194E(02) |
| Ex. 1d MMA-NVP = 3/1 (Mw = 150 K) control) | 1.120E(01) | 5.596E(03) |
| | 2.850E(01) | 2.970E(03) |
| | 1.458E(02) | 1.138E(03) |
| | 3.469E(02) | 6.148E(02) |
| | 8.366E(02) | 3.279E(02) |
| | 1.694E(03) | 1.960E(02) |
| | 3.388E(03) | 1.199E(02) |
| 5 PVOH-1//Ex. 1d (80//20) | 1.172E(01) | 1.825E(04) |
| | 3.407E(01) | 7.430E(03) |
| | 7.503E(01) | 4.622E(03) |
| | 1.535E(02) | 2.853E(03) |
| | 3.242E(02) | 1.715E(03) |
| | 8.777E(02) | 8.626E(02) |
| | 2.262E(03) | 3.788E(02) |
| | 4.525E(03) | 2.142E(02) |
| PVOH-2 (control) | 1.250E(01) | 1.628E(03) |
| | 2.499E(01) | 8.142E(02) |
| | 5.923E(01) | 6.872E(02) |
| | 1.087E(02) | 5.317E(02) |
| | 2.377E(02) | 4.417E(02) |
| | 6.241E(02) | 2.843E(02) |
| | 1.346E(03) | 1.837E(02) |
| | 2.693E(03) | 1.236E(02) |
| 6 PVOH-2//Ex. 1d (80//20) | 1.016E(01) | 2.644E(03) |
| | 2.229E(01) | 2.264E(03) |
| | 5.802E(01) | 1.655E(03) |
| | 1.241E(02) | 1.160E(03) |
| | 2.845E(02) | 7.239E(02) |
| | 7.053E(02) | 4.213E(02) |
| | 1.561E(03) | 2.471E(02) |
| | 3.122E(03) | 1.522E(02) |
| 7 PVOH-2//Ex. 1d (50//50) | 1.057E(01) | 3.927E(03) |
| | 2.080E(01) | 3.248E(03) |
| | 5.835E(01) | 2.706E(03) |
| | 1.333E(02) | 1.642E(03) |
| | 2.829E(02) | 1.056E(03) |
| | 7.656E(02) | 5.795E(02) |
| | 1.718E(03) | 3.059E(02) |
| | 3.437E(03) | 1.882E(02) |

EXAMPLE 36

This example presents physical and gas permeation properties (Table VI) for the MMA/N-VP copolymer of Example 1d and its blends with PVOH-2 in a 4:1 and the lower surface to the carrier gas (1% H2 in N2). The transmission of oxygen at steady state was monitored and detected by a nickel cadmium fuel cell known as a Coulox Detector. The Ox-Tran 1000 unit was equipped to record the steady state flux in units of cc.mil/100in2.Atm.Day. Measurements were made at 23° C. and 0% relative humidity unless otherwise stated.

The mechanical properties of the blend were evaluated with the aid of parts which were prepared by injection molding. The pelletized extrudates were dried in a forced air oven prior to injection molding on a 30 ton Newbury injection molding machine equipped with a heated, ASTM family mold. An injection pressure of 3790 kPa and a back pressure of 690 kPa was employed. The melt temperature may vary from 193°–221° C., depending on the viscosity of the polymer melt.

Injection molded parts were prepared from samples of the above listed compositions, and tested under ASTM procedures for the evaluation of physical properties of polymers. The ASTM test methods employed are as follows: Specific Gravity-D792-66 (reapproved 1979); Tensile-Yield, Elongation and Tensile Elastic Modulus-D638-84; Tensile Impact Strength ASTM D1822; Izod Impact—D256-84; Charpy Impact ASTM D256; Heat Deflection Temperature D648-72; Clash-Berg Torsional Modulus-D-1043; Oxygen Permeability ASTM D-3985. Results of the comparative example (MMA-NVP) and blends are given below in Table VI.

67.8 grams of N-dodecyl mercaptan, 3363.4 grams of deionized water and 105.94 grams of a 10% aqueous sodium dodecylbenzene sulfonate solution.

Each monomer mixture was polymerized according to the following procedure. To an appropriate glass vessel equipped with stirrer, heater, a reflux condenser, and nitrogen sparge tube, was added 7534.01 grams of deionized water, and 2.52 grams of sodium carbonate. The mixture was sparged for one hour with nitrogen while heating to 70° C. The sparge rate was then changed to a sweep and 317.81 grams of a 10% aqueous solution of sodium dodecylbenzene sulfonate was added to the mixture. The temperature of the reaction vessel was then raised to 85° C. At this temperature, 126.07 mL of the initiator mixture, which consisted of 5.65 grams of sodium persulfate and 1633.27 grams of deionized water, was added to the reaction vessel. The monomer mixture was then fed into the reaction vessel over a three-hour period.

As the polymerization proceeded, the initiator mixture was added to the reaction vessel at the rate of 126.07 mL every 15 minutes. The accumulation of solids was measured every 30 minutes just before the addition of the initiator mixture. At the completion of the initiator and monomer addition the mixture was held at 85° C. for one hour. The mixture was then

TABLE VI

Physical Properties of MMA-NVP = 75/25 Copolymer and PVOH/MMA-NVP = 75/25 Blends.

| PHYSICAL PROPERTY | EXAMPLES | | | |
|---|---|---|---|---|
| | MMA-NVP = 75/25 | 5 | 23 | 24 |
| Specific Gravity | 1.20 | 1.26 | 1.235 | 1.22 |
| Tensile-Yield, mPa | 76.8 | 114.3 | 94.0 | 78.4 |
| Elongation @ Break % | 4.15 | 57.00 | — | 64.83 |
| Tensile-Modulus, mPa | 3287 | 4782 | 4382 | 4283 |
| Tensile Impact Strength (kg. cm/sq. cm) | 32.53 | 110.1 | 31.8 | 64.16 |
| Dynatup Impact Strength (kg. cms.) | 23.2 | 26.2 | 19.8 | 21.0 |
| Notched Izod @ 0.0° C. (kg. cms./cm.) | 1.96 | 2.39 | 3.54 | 1.96 |
| Notched Izod @ 23° C. (kg. cms./cm.) | 1.20 | 2.35 | 1.48 | 2.46 |
| Unnotched Izod 23° C. (kg. cms./cm.) | 3.03 | 6.89 | 3.80 | 5.87 |
| Unnotched Charpy kg. cms/0.5 cm2) 23° C. | 12.5 | 24.4 | | 18.8 |
| Rockwell Hardness (unannealed), M | 100.75 | 103.15 | 100.90 | 95.1 |
| Rockwell Hardness (ann. 4 hrs. @ 80° C.), M | 102.45 | 105.30 | 101.65 | 98.1 |
| DTUFL (1820 kPa, 2° C./min.) (unannealed) °C. | 85.20 | 65.55 | 64.65 | 73.5 |
| DTUFL (1820 kPa, 2° C./min.) (ann. 4 hrs. @ 80° C.),°C. | 90.75 | 67.05 | 68.70 | 74.6 |
| CLASH-BERG TORSIONAL | | | | |
| MODULUS, kPa @ 40° C. | 272E(04) | 273E(04) | 142E(04) | 109E(04) |
| kPa @ 80° C. | 179E(04) | 96E(03) | 14E(04) | 25E(04) |
| Oxygen Permeability @ 0% RH cc.mil/100 in2.Day.Atm | 8.76 | 0.0013 | 0.0013 | 0.0013 |

EXAMPLE 37

This example teaches the general method for preparing terpolymers of methyl methacrylate, N-vinyl pyrrolidone, and methacrylic acid. A terpolymer comprising 25 weight percent of NVP, 1 weight percent methacrylic acid (MAA), and the remainder MMA was prepared by an emulsion polymerization technique as follows: A monomer mixture was prepared, having methyl methacrylate:N-vinyl pyrrolidone:methacrylic acid ratio of 74:25:1. The mixture contained 4181 grams of MMA, 1412.5 grams of NVP, 56.5 grams of MAA, cooled, filtered and the polymer isolated by coagulation with a 2% solution of magnesium acetate. The polymer was dried in a vacuum oven prior to blending experiments. The molecular weight of this polymer was about 50,000.

In a similar manner, many polymers of alkyl (meth)acrylates, unsaturated lactams or amides, and unsaturated acids may be prepared.

EXAMPLE 38

This example describes further preparations of co- and terpolymers examined as the second polymer component of blends with polymers of high vinyl alcohol content. It further lists other vinyl alcohol polymers incorporated into the study.

PVOH-6, commercially known as AIRVOL ®-107 is a fully hydrolyzed (98.0–98.8 mol %) resin having a molecular weight of 31,000–50,000.

PVOH-7, commercially known as AIRVOL ®-125 is a "super" hydrolyzed (99.3 mol %) resin having a molecular weight of 85,000–146,000.

PVOH-8, commercially known as AIRVOL ®-325 is a fully hydrolyzed (98.0–98.8 mol %) resin having a molecular weight of 85,000–146,000.

PVOH-9, commercially known as AIRVOL ®-350 is a fully hydrolyzed (98.0–98.8 mol %) resin having a molecular weight of 124,000–186,000.

Polymers of MMA with NVP and, in some instances, methacrylic acid (MAA) were prepared by the methods of Examples 1 or 37. Example 38-I contains glycidyl methacrylate, rather than methacrylic acid (Table VII).

TABLE VII

| Sample No. Preparation | MMA | NVP | MAA | MW |
| --- | --- | --- | --- | --- |
| 38-A | 75 | 25 | — | 140,000 |
| 38-B | 70 | 25 | 5 | 140,000 |
| 38-C | 75 | 25 | — | 164,000 |
| 38-D | 74 | 25 | 1 | 164,000 |
| 38-E | 73 | 25 | 2 | 155,000 |
| 38-F | 72 | 25 | 3 | 131,000 |
| 38-G | 70 | 25 | 5 | 143,000 |
| 38-H | 68 | 25 | 7 | 60,000 |
| 38-I | 65 | 25 | 10* | 143,000 |
| 38-J | 75 | 25 | — | 147,000 |
| 38-K | 74 | 25 | 1 | 75,900 |
| 38-L | 72 | 25 | 3 | 71,500 |
| 38-M | 70 | 25 | 5 | 72,800 |

The thermal properties (Table VIII) of blends in the systems: MMA-NVP, MMA-NVP-MAA/PVOH were investigated by melt mixing on the SYSTEM 90 TORQUE RHEOMETER (HAAKE RHEOCORD) and by DSC. The homopolymers and blends, listed in Table IX, were processed on the HAAKE RHEOCORD at a set temperature of 200° C. and rotor rate of 80 RPM. The mixing time was ca. 30 minutes. The compositions are given in weight percent. As can be seen from the data listed in Table VIII, the thermal properties of some of the blends, exhibiting two T$_g$s, are characteristic of polymer blends systems that are compatible but immiscible in the thermodynamic sense. The mixing torque behavior yields information on the thermal and rheological stability of the blends in the molten state. The main feature of these torque vs. time curves includes an initial sharp peak due to material loading and a stable plateau region. The torque value in the plateau region, termed "stable torque", Table IX, characterizes the viscous nature of the melt. The data listed in Table IX also provides information on the gain in thermal stability, represented as the time for "CHAR FORMATION", upon melt blending the acrylic terpolymer (MMA/NVP/MAA=75/25/05) and to a lesser extent the acrylic copolymer (MMA/NVP=75/25) with fully and partially hydrolyzed PVOH (PVOH-6 and PVOH-2).

It has previously been shown that the value of the stable torque and the rotor rate are directly related to the shear stress and shear rate respectively, in conventional viscometry. The gross features of the torque vs. time curves suggest that the association of (MMA/NVP=75/25), Ex. 38-A, with PVOH-2 hydrogen bonding leads to a polymer melt of higher viscosity than that calculated by the additivity rule for non-interacting mixtures.

An interesting feature of the acrylic copolymer/partially hydrolyzed PVOH blend is seen in the large positive deviation and subsequent stabilization of the torque at the end of the mixing period. A similar but greater positive deviation in torque is observed for the MMA-NVP-MAA, Ex. 38-B/PVOH-2 blend. A unique feature of the latter blend is seen in the rapid increase in torque in the 10–30 minutes mixing interval. This increase in torque may be attributed to grafting and or cross-linking via —COOH, —OH esterification reaction. Higher torque values are recorded during mixing, in the case of the MMA-NVP-MAA, Ex. 38-G/PVOH-6 system as compared to the MMA-NVP, Ex. 38-C/PVOH-6 system. A common characteristic of blends of acrylic co- and terpolymers with fully hydrolyzed PVOH is the relatively stable torque attained throughout the entire thirty minutes of residence time in the HAAKE mixing bowl. Blends of both fully and partially hydrolyzed PVOH with the acrylic terpolymer (MMA-NVP-MAA) yielded higher mixing torque than blends of PVOH with the copolymer (MMA-NVP). One possible explanation for this observation is the formation of high molecular weight copolymers from the melts of (MMA/NVP/MAA) and PVOH. Another interesting observation obtained from samples of the (MMA-NVP-MAA=70/20/05)/PVOH polymer melt throughout the 30 minutes of HAAKE RHEOCORD melt-mixing is the absence of degradation in the form of charred particulates. Samples taken from the polymer melt appear to be similar in color to the similarly processed acrylic terpolymer, Table IX.

The following solvent fractionation scheme was prepared to calculate the percent of graft links and grafting efficiency of the (MMA-NVP-MAA) acrylic terpolymers:

PVOH/(MMA—NVP—MAA)—MELT BLEND
|
| DMSO + THF
↓

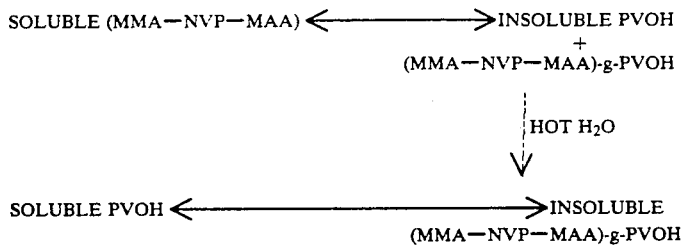

The percent grafted PVOH and grafting efficiency of the acrylic terpolymer (MMA-NVP-MAA), calculated from the above scheme and listed in TABLE XI, are supported qualitatively by FTIR spectra. The FTIR spectra show increasing evidence of the presence of an ester carbonyl stretching frequency within the frequency range of 1726–1735 cm$^{-1}$. It is noteworthy to mention that evidence of this ester is not discernible in either the FTIR spectrum of the acrylic terpolymer nor that of PVOH-6. Hence, we may conclude that this ester functionality may have resulted from the esterification reaction between the —OH of PVOH-6 and the —COOH of the acrylic terpolymer(MMA-NVP-MAA).

Another evidence of grafting is discernible from the increase in tensile-modulus with increasing percent graft (see Table X).

EXAMPLE 39

This example discloses typical blend conditions for blends reported in Tables VIII and IX.

PVOH and a copolymer of methyl methacrylate-N-vinyl pyrrolidone were dry blended in a polyethylene bag to yield a compound which consisted of a 80:20% weight ratio of PVOH to methyl methacrylate-co-N-vinyl pyrrolidone copolymer. The mixture was fed into the hopper of a single screw Killion extruder in which the mixture was melt compounded and extruded at the following extrusion conditions:

| EXTRUDER BARREL TEMPERATURES: | ZONE-1: 180° C. |
|---|---|
| | ZONE-2: 193° C. |
| | ZONE-3: 193° C. |
| DIE TEMPERATURES: | DIE-1: 193° C. |
| | DIE-2: 193° C. |
| SCREW SPEED: | 80 RPM |

Other conditions may be used, depending on the viscosity of the blend, for example, a barrel setting of 390°–400° F. (200°–204° C.) and screw speed of 100 rpm (Examples 15 and 12), or 400°–415° F. (204°–213° C.) at 100 rpm (Examples 22–38).

$T_g$ and $T_m$ values are measured by differential scanning calorimetry. $DH_f$ is the heat of fusion calculated from the response.

TABLE VIII

Thermal Properties of Homopolymers and Blends in the Systems: (MMA-NVP), (MMA-NVP-MAA)/PVOH

| No. | Polymer/Blend | Comp. (w/w) | $T_g$(°C.) | $T_m$(°C.) | $DH_f$ (J/g) |
|---|---|---|---|---|---|
| 38-01 | PVOH-6 | 100 | 75.29 | 221.58 | 74.30 |
| 38-02 | PVOH-2 | 100 | 69.29 | 167.1 | 37.13 |
| 38-03 | PVOH-8 | 100 | 77.55 | 225.77 | 69.09 |
| 38-04 | PVOH-9 | 100 | 78.26 | 226.87 | 65.95 |
| 38-05 | PVOH-3 | 100 | 74.93 | 224.97 | 48.48 |
| 38-06 | PVOH-7 | 100 | 66.80 | 221.96 | 86.55 |
| 38-07 | 38-A | 100 | 123.60 | | |
| 38-08 | 38-D | 100 | 117.87 | | |
| 38-09 | 38-E | 100 | 117.40 | | |
| 38-10 | 38-F | 100 | 135.30 | | |
| 38-11 | 38-G | 100 | 139.50 | | |
| 38-12 | 38-H | 100 | 144.30 | | |
| 38-13 | PVOH-2/38-A | 80/20 | 72.79, 115.95 | 187.80 | 26.43 |
| 38-14 | PVOH-2/38-G | 80/20 | 6.76, 114.84 | 191.24 | 27.53 |
| 38-15 | PVOH-6/38-A | 80/20 | 74.14, 116.01 | 225.29 | 63.21 |
| 38-16 | PVOH-6/38-D | 80/20 | 74.13, 113.44 | 214.95 | 62.04 |
| 38-17 | PVOH-6/38-E | 80/20 | 73.01, 115.20 | 213.65 | 65.26 |
| 38-18 | PVOH-6/38-F | 80/20 | | | |
| 38-19 | PVOH-6/38-G | 80/20 | 74.25, 116.07 | 214.34 | 58.73 |
| 38-20 | PVOH-6/38-H | 80/20 | | | |
| 38-21 | PVOH-6/38-I | 80/20 | 71.80, 112.04 | 225.23 | 67.95 |
| 38-22 | PVOH-8/38-A | 80/20 | 76.70 | 224.03 | 49.29 |
| 38-23 | PVOH-8/38-D | 80/20 | 76.47 | 224.11 | 56.38 |
| 38-24 | PVOH-8/38-E | 80/20 | 78.17 | 228.32 | 54.01 |
| 38-25 | PVOH-8/38-F | 80/20 | 78.58 | 226.40 | 58.60 |
| 38-26 | PVOH-8/38-G | 80/20 | 77.33 | 225.70 | 66.00 |
| 38-27 | PVOH-9/38-A | 80/20 | 77.59 | 225.32 | 49.23 |
| 38-28 | PVOH-9/38-D | 80/20 | 76.81 | 225.32 | 54.11 |
| 38-29 | PVOH-9/38-F | 80/20 | 78.66 | 226.70 | 59.80 |
| 38-30 | PVOH-9/38-G | 80/20 | 78.33 | 224.50 | 62.40 |
| 38-31 | PVOH-3/38-A | 80/20 | 74.27 | 217.72 | 33.84 |
| 38-32 | PVOH-3/38-D | 80/20 | 74.11 | 220.68 | 41.56 |
| 38-33 | PVOH-3/38-F | 80/20 | 73.78 | 219.40 | 37.50 |
| 38-34 | PVOH-3/38-G | 80/20 | 75.51 | 220.0 | 49.00 |
| 38-35 | PVOH-7/38-A | 80/20 | 74.37 | 224.49 | 46.73 |
| 38-36 | PVOH-7/38-D | 80/20 | 76.36 | 226.11 | 51.47 |
| 38-37 | PVOH-7/38-F | 80/20 | 77.91 | 225.90 | 57.70 |
| 38-38 | PVOH-7/38-G | 80/20 | 78.23 | 226.10 | 59.40 |

TABLE IX

Thermal and Rheological Stability of PVOH and Blends at 200° C.

| | EXAMPLES 38 - | | | | | | | |
|---|---|---|---|---|---|---|---|---|
| | 1 | 2 | 7 | 11 | 13 | 14 | 15 | 19 |
| STABLE TORQUE (N · m) | 6.6 | 8.5 | 12.3 | 10.6 | 11.2 | 12.1 | 9.1 | 12.9 |
| CHAR FORMATION (min.) | 15.0 | 15.0 | >30.0 | >30.0 | 20.0 | >30.0 | 20.0 | >30.0 |

TABLE X

Physical Properties of Alloys of PVOH with (MMA-NVP-MAA) Acrylic Terpolymers

| | EXAMPLES 38 - | | | | |
|---|---|---|---|---|---|
| | 15 | 16 | 17 | 19 | 21 |
| Specific Gravity | 1.28 | 1.28 | 1.28 | 1.29 | |
| Tensile-Yield, KPa | 0.00 | 0.00 | 0.00 | 132 | 0.00 |
| Elongation @ Break % | 3.10 | 3.60 | 1.30 | 8.07 | 2.30 |
| Tensile-Modulus, MPa | 5780 | 5319 | 6463 | 6896 | 5214 |
| Tensile Impact Strength (Joules/cm$^2$) | 4.57 | 6.69 | 7.74 | 7.31 | 3.11 |

TABLE X-continued

Physical Properties of Alloys of PVOH with (MMA-NVP-MAA) Acrylic Terpolymers

| | EXAMPLES 38 - | | | | |
|---|---|---|---|---|---|
| | 15 | 16 | 17 | 19 | 21 |
| Dynatup Impact Strength (Joules) | 3.66 | 1.59 | 1.7 | 1.86 | 2.6 |
| Notched Izod @ 0° C. (kg-cm/cm of notch) | | | 1.85 | 1.68 | |
| Notched Izod @ 23° C. (kg-cm/cm of notch) | 2.18 | 2.39 | 2.28 | 2.34 | 2.77 |
| Unnotched Izod 23° C. (Joules) | | | 8.72 | 8.53 | |
| Unnotched Charpy @ 23° C. (Joules) | | | 22.8 | 18.0 | |
| Rockwell Hardness (unannealed), P | | | 96.15 | 97.35 | |
| Rockwell Hardness (ann. 4 hrs. @ 80° C.), P | | | 97.85 | 98.55 | |
| DTUFL (1,818 KPa, 2° C./min.) (unannealed) °C., | | | 83.20 | 88.05 | |
| DTUFL (1,818 KPa, 2° C./min.) (annealed 4 hrs. @ 80° C.),°C. | | | 87.75 | 90.00 | |
| Clash-Berg Torsional Modulus, mPa @ 40° C. | 3664 | 4580 | 4204 | 3893 | |
| @ 80° C. | 679 | 706 | 774 | 890 | |
| @ 80° C. | 133 | 153 | 184 | 243 | |

TABLE XI

Grafting of (MMA-NVP-MAA) onto PVOH-6

| Example | Initial Wt. of PVOH (g) | Wt. of PVOH After Grafting (g) | Percent Graft (%) | Graft Efficiency (%) |
|---|---|---|---|---|
| 38-16 | 0.0798 | 0.0827 | 3.63 | 14.50 |
| 38-17 | 0.0804 | 0.0881 | 9.58 | 38.50 |
| 38-19 | 0.0800 | 0.0936 | 17.00 | 68.00 |

EXAMPLE 40

This experiment describes the preparation of thin blown film from PVOH/MMA/NVP copolymers, and some of the mechanical properties of the films (Table XIII), noting that PVOH without the additive could not be processed into film under these conditions.

The material derived from Example 38-13 was successfully blown into thin (0.025 mm) film by the method described below and in Table XII:

The processing equipment consisted of the following components:

1) A one inch (25.4 mm) Killion Extruder with a L/D of 24:1 and a screw design of the following dimensions: Feed Zone=8 D, Compression Zone=8 D, and Metering Zone=8 D.

This particular configuration was chosen to ensure that the polymer melt undergoes processing and mechanical homogenization at the lowest possible temperature.

2) A melt filter that consisted of four screens (40, 60, 80 and 40 mesh ASTM) was placed between the extruder and the blowing head for the purpose of restricting the passage of foreign bodies.

3) The die design was of the spiral mandrel type geometry.

This design favors high throughput and adequate efficiency. The polymer melt enters the die axially and leaves through four radial ports located just above the base of the die. From the port exits, the molten polymer flows along the helices of the spiral mandrel to the annular die lip. The die land was 12.7 mm. in length and the gap was set at 7.62 mm.

4) Cooling ring and vertical blown film tower. The former device serves the purpose of cooling the bubble to a reasonable temperature before the film comes into contact with the nip roll assembly that is housed in the blown film tower.

5) Haul-off Unit. This unit comprises of a pair of collapsing frames and haul-off or squeeze rolls.

TABLE XII

Typical Screw Design and Extrusion Conditions for Film-Blowing of Composition from EXAMPLE 38-13

| MATERIAL | EXAMPLE 38-13 | | |
|---|---|---|---|
| ZONE-1° C. | 210 | 204 | 204 |
| ZONE-2° C. | 210 | 207 | 207 |
| ZONE-3° C. | 216 | 207 | 207 |
| ZONE-4° C. | 216 | 207 | 207 |
| DIE-1° C. | 210 | 207 | 210 |
| DIE-2° C. | 210 | 207 | 210 |
| SCREW RPM | 55 | 30 | 30 |
| AMPS | 10 | 11 | 11 |
| MELT° C. | 237 | 218 | 219 |
| PRESSURE kPa | 27560 | 33070 | 32380 |
| TOP NIP SPEED, MPM | 5.59 | 5.52 | 5.55 |
| BLOWER PRESSURE, kPa | 172 | 172 | 172 |
| WINDER SPEED, MPM | 6.1 | 6.1 | 6.1 |
| FILM: | | | |
| THICKNESS (mms.) | .025 | .025 | .025 |
| LAY FLAT (mms.) | 152 | 152 | 152 |

TABLE XIII

Mechanical Properties of Thin Films From the Composition Designated as EXAMPLE 38-13

| PROPERTY | UNITS | EXAMPLE 38-13 |
|---|---|---|
| TEAR RESISTANCE | kgs/mm. | 52.2(MD) |
| | kgs/mm. | 95.3(TD) |
| TEAR PROPAGATION RESISTANCE | kgs/mm. | 0.53(MD) |
| | kgs/mm. | -.--(TD) |
| ELONGATION @ BREAK | % | 64.00(MD) |
| | % | 5.80(TD) |
| TENSILE MODULUS | MPa | 84.06(MD) |
| | MPa | 591.10(TD) |

EXAMPLE 41

This example describes co-injection stretch blow molding experiments of poly(ethylene terephthalate) (PET) with several barrier resins, including the PVOH//MMA/NVP blend of Example 38-13. The oxygen permeability performance of the laminated resins containing the blend of the present invention is comparable with the other laminates and improved over the monolithic PET. The co-injection stretch blow molding method was carried out as follows:

a) Resin A (PET) was injected from an extruder into a vertically mounted mold;

b) Resin B (Barrier Layer) was then injected concentrically and circularly into the mold cavity;

c) The parison, thus formed, was rotated to a conditioning pot where it was conditioned at a temperature of 230° C. for 10 seconds;

d) Conditioning was followed by simultaneous stretching and blowing of the parison into an 8-ounce bottle.

The barrier resins chosen were Nylon MXD-6, a poly(m-xylylenediamine adipate), and EVAL-T-102A, believed to be an ethylene-vinyl alcohol polymer containing ca. 32 mol % ethylene. Molding conditions for the co-injection molding are given in Table XIV and permeability data in conventional permeability units in Table XV. The blend used is that of Example 38-13, containing one weight percent of octadecyl di-t-butyl-hydroxyhydrocinnamate antioxidant.

tion of the viscosity and the concomitant loss of favorable physical properties. PET was dried at 120° C. in a vacuum oven. The alloy was also dried at 80° C. in a vacuum oven. The thickness of the core layer was varied from 1.5 to 5 mils, 1 mil being 0.025 mm. The substrate or skin layers was varied as follows; thickness of each layer: 3, 5, 7, 9, 12 and 14 mils.

The oxygen permeability of the multilayer films are reported in Table XVI.

TABLE XIV

Processing Conditions for the Co-injection Molding of PET with each of the Following Resins: Nylon MXD6, EVAL-T102A and Ex.38-13

| Items | Units | PET | MXD6 | EVAL-T | EX. 13 |
|---|---|---|---|---|---|
| Cylinder: | °C. | 250 | 250 | 200 | 200 |
|  | °C. | 270 | 250 | 200 | 200 |
|  | °C. | 270 | 250 | 200 | 200 |
| Nozzle Temp. | °C. | 270 | 240 | 220 | 220 |
| Shot Size | cc/sec | 30 | 12 | 6 | 6 |
| Injection Pressure | kg/cm2 | 150,40,35 | 145,140,145 | 145,110,115 |  |
| Velocity | cc/sec. | 13,13,13 | 10,10,17 | 45,45,45 |  |
| Injection Time | sec. | 6.3 | 6.3 | 6.3 | 6.0 |
| Cooling Time | sec. | 6.0 | 6.0 | 6.0 | 6.0 |
| Cavity Temp. | °C. | 60.0 | 60.0 | 60.0 | 60.0 |
| Cycle Time | sec. | 29.3 | 29.3 | 29.3 | 29.3 |
| Pot Temp. | °C. | 230.0 | 230.0 | 230.0 | 230.0 |

TABLE XV

Comparison of the Oxygen Permeability Measurements of Monolithic and multilayer PET 8-ounce Bottles.

| COMPOSITION | PERMEABILITY(c/Pack/Day) |
|---|---|
| PET | 0.0253 |
| PET/NYLON-MXD6/PET | 0.0187 |
| PET/EVAL-T102A/PET | 0.0058 |
| PET/Ex.38-13/PET | 0.0153 |

TABLE XVI

Oxygen Permeability of Multilayer Composites.

| COMPOSITE | THICKNESS (mil) | PERM.* |
|---|---|---|
| PET/(EVAL-T102A)/PET | 13.5 | 0.4185 |
| PET/(PVOH-2/38-A = 80/20)/PET | 4.5 | 0.1535 |
| PET/(PVOH-2/38-D = 90/10)/PET | 6.5 | 0.2959 |
| PET/(PVOH-2/38-F = 80/20)/PET | 10.3 | 0.4212 |
| PET/(PVOH-2/38-G = 90/10)/PET | 9.0 | 0.3336 |

*cc.mil/(100 in2.Day.Atm.)

EXAMPLE 42

In this experiment are reported the preparation of ternary multilayer composites from sheet co-extrusion, and a comparison of the oxygen permeability which shows improved barrier properties for the laminates containing the blends of the present invention, even at thinner film usage, over ethylene-vinyl alcohol polymer.

The coextrusion was carried out with the aid of a simple feed block design. In this design a second melt stream is introduced from an extruder which is mounted perpendicular to a main or central extruder such that the melted polymer emitting from the central extruder becomes encapsulated by the melt from the second extruder. Because of the drastic difference in the thermal and rheological characteristics of the substrate (PET) and core layer (MMA-NVP-MAA)/PVOH alloy, care was taken in selecting the respective extruder screws. The screw designs chosen were as follows:

1) Extruder one was equipped with a single stage metering type screw, the metering section being 30% of the total length of the screw;

2) Extruder two was fitted with a two stage mixing and plastication screw. The latter screw was chosen in order to facilitate the melting and homogenizing of the partially crystalline PET resin. The former screw configuration enabled the (MMA-NVP-MAA)/PVOH alloy to attain the necessary melt consistency without the occurrence of severe degradation due to processing. Both the PET homopolymer and the 'barrier' alloy was thoroughly dried before being fed into the hopper of the respective extruders, to prevent undue degrada-

EXAMPLE 43

In a manner similar to Example 37, copolymers of methyl methacrylate/N-vinylpyrrolidone/copolymerizable acid may be prepared and isolated, such as:

MMA/NVP/methacrylic acid=94/5/1
MMA/NVP/methacrylic acid=90/5/5
MMA/NVP/methacrylic acid=90/9/1
MMA/NVP/methacrylic acid=79/20/1
MMA/NVP/acrylic acid=94/5/1
MMA/NVP/acryloxypropionic acid=90/5/5
MMA/butyl/acrylate/vinyl acetamide/glycidyl methacrylate=48/40/10/2
MMA/ethyl acrylate/acrylamide/maleic anhydride=20/74/5/1.

They may be blended with PVOH as in Example 38, and processed into useful films by methods similar to those taught in Example 39.

EXAMPLE 44

In this Example is reported the utility of the additive polymers of the present invention in improving the modulus of soft polymers containing units derived from vinyl alcohol and alkyleneoxy (meth)acrylates.

The commercial resins known as Vinex TM are supplied by Air Products Co., Allentown, Pa. Their exact analysis is not known; they are believed to contain units derived from vinyl alcohol and from an alkyleneoxy methacrylate. VINEX TM -1007 and -2025 differ chemically in the amounts of vinyl acetate and alkyleneoxymethacrylate comonomers. VINEX TM -1007 contains a significantly higher lever of vinyl alcohol mers than VINEX TM -2025. They also appear to contain varying amounts of an external plasticizer, probably glycerol, to confer melt processability. The plasticizer sometimes exudes after processing, an undesirable effect. This difference in chemical composition manifests itself in the thermal and mechanical properties of the resins.

The acrylic copolymers (MMA-NVP 75/25) and (MMA-NVP=85/15) were prepared as described previously from commercially available monomers, being similar to the additive polymers described in Examples 21 and 27, respectively. The admixed materials were prepared from dry blends of acrylic copolymer and VINEX TM resin followed by extrusion in a single screw Killion extruder at temperatures ranging from 204° C. to 210° C., and a screw speed of 80 RPM. The extrudates were pelletized and dried prior to evaluation of thermal and mechanical properties. Testing was done as in earlier examples, such as Example 38. The very high tensile impact for Example 43-1 is related to its low modulus and glass temperature, it being an almost rubbery material.

The thermal properties of the blends (Table XVII) suggest that the acrylic copolymers exhibit a high degree of compatibility with the VINEX TM resins. Evidence of this compatibility may be inferred from the single $T_g$s of the binary blends. The mechanical properties of the VINEX TM resins are also significantly improved by the addition of a minimum of 10 weight percent of the acrylic copolymer (MMA-NVP)(Table XVIII).

TABLE XVII

Thermal Properties of Acrylic Copolymers, VINEX TM Resins and Blends of the same.

| EX. 44- | Composition | $T_g$(°C.) | $T_m$(°C.) | DH$_f$(J/g) |
|---|---|---|---|---|
| -1. | VINEX TM -1007 | 35.0 | 211.5 | 61.8 |
| -2. | VINEX TM -2025 | 44.4 | 180.4 | 41.1 |
| -3. | (MMA-NVP = 75/25) | 124.9 | | |
| -4. | (MMA-NVP = 85/15) | 120.5 | | |
| -5. | (EX. 1/EX. 3 = 90/10) | 40.1 | 211.5 | 57.8 |
| -6. | (EX. 1/EX. 3 = 80/20) | 44.4 | 213.5 | 51.3 |
| -7. | (EX. 1/EX. 4 = 90/10) | 35.3 | 210.3 | 55.6 |
| -8. | (EX. 1/EX. 4 = 80/20) | 37.0 | 211.8 | 56.8 |
| -9. | (EX. 2/EX. 3 = 90/10) | 46.0 | 188.3 | 28.7 |
| -10. | (EX. 2/EX. 3 = 80/20) | 48.3 | 189.1 | 28.4 |
| -11. | (EX. 2/EX. 4 = 90/10) | 44.8 | 188.0 | 31.4 |
| -12. | (EX. 2/EX. 4 = 80/20) | 45.7 | 187.8 | 28.2 |

TABLE XVIII

Thermal and Mechanical Properties of VINEX TM -1007 and Blends of the Same with Acrylic Copolymers: (MMA-NVP = 85/15) & (MMA-NVP = 75/25).

| PROPERTY | EXAMPLES | | | | |
|---|---|---|---|---|---|
| | 44-1 | 44-5 | 44-6 | 44-7 | 44-8 |
| SPECIFIC GRAVITY | 1.303 | 1.296 | 1.285 | 1.295 | 1.288 |
| Tg(°C.) | 35.0 | 40.1 | 44.4 | 35.3 | 37.0 |
| TENSILE-YIELD, mPa | 7.8 | 41.0 | 0.00 | 41.2 | 36.5 |
| ELONGATION @ BREAK % | 259.3 | 68.4 | 3.0 | 61.7 | 19.0 |
| TENSILE-MODULUS mPa | 241 | 1707 | 2172 | 1791 | 1733 |
| TENSILE IMPACT STRENGTH (J/cm²) | 124 | 1.5 | 1.8 | 1.4 | 0.85 |
| DYNATUP IMPACT STRENGTH (Joules) | 3.58 | 3.37 | 2.60 | 3.34 | 2.28 |
| NOTCHED IZOD @ 0.0°C. (J/cm) | 0.24 | 0.44 | 0.31 | 0.33 | 0.36 |
| NOTCHED IZOD @ 23° C. (J/cm) | 0.94 | 0.48 | 0.44 | 0.48 | 0.42 |
| DTUFL (264 psi. 2° C./min.) (unann.) °C. | 45.15 | 51.05 | 57.05 | 54.85 | 57.75 |
| DTUFL (264 psi. 2° C./min.) (ann.) °C. | 51.00 | 64.70 | 72.40 | 62.25 | 66.50 |

TABLE XVIII-continued

Thermal and Mechanical Properties of VINEX TM -1007 and Blends of the Same with Acrylic Copolymers: (MMA-NVP = 85/15) & (MMA-NVP = 75/25).

| PROPERTY | EXAMPLES | | | | |
|---|---|---|---|---|---|
| | 44-1 | 44-5 | 44-6 | 44-7 | 44-8 |
| CLASH-BERG TORSIONAL MODULUS, mPa @ 40° C. | 532 | 815 | 1167 | 837 | 880 |
| mPa @ 80° C. | 278 | 276 | 393 | 285 | 337 |
| mPa @ 120° C. | 88.7 | 73.2 | 70.5 | 88.5 | 61.9 |

EXAMPLE 45

In this Example is reported the utility of the additive polymers of the present invention in improving the clarity of polymers containing units derived from vinyl alcohol and alkyleneoxy (meth)acrylates.

Similar improvements in physical properties are obtained from melt blends of an acrylic terpolymer (MMA-NVP-MAA=74/25/01), similar to that described in Example 37, with VINEX TM. One interesting observation that is notable of the latter alloys is the optical clarity of the extrudates derived from blends with VINEX TM -2025 and VINEX TM -2034, a polymer similar to the other VINEX TM materials noted, and also of unknown specific composition, for ratios of 1:9 and 1:4 respectively. This clarity is noteworthy because the extrudates of unmodified VINEX TM -2025 and VINEX-2034 TM are both opaque in appearance.

We claim:

1. A process for forming a fiber from a melt processable polymeric blend which comprises:

a) from about 50 to about 90 parts of a first polymer containing units of the structure

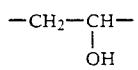

and optionally units of the structure

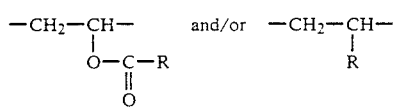

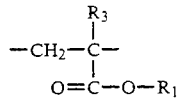

wherein R is H or —($-$CH$_2$)$_m$—CH$_3$, where m is 0 to 7 and R$_1$ is an alkyleneoxy group, and R$_3$ is H or CH$_3$;

b. from about 10 to about 50 parts of a second polymer containing from about 5 to about 95 parts of units of the structure

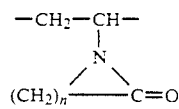

or

-continued

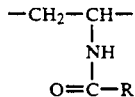

or

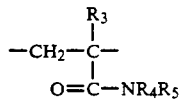

or

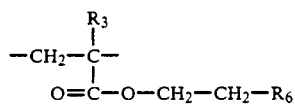

or

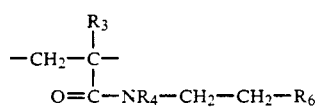

wherein n is 2, 3, 4, or 5, $R_4$ and $R_5$ may be the same or different and are H, $C_1$-$C_4$ alkyl, or —$C_2H_4$—(O—$C_2H_4$)— in a cyclic form, and where $R_6$ is a urea or cyclic ureido structure of the formula

or

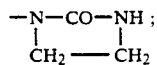

and from about 94 to about 4 parts of units of the structure

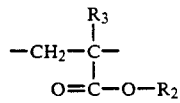

wherein $R_2$ is $C_1$-$C_4$ alkyl; and from about 1 to about 10 parts of a copolymerizable unsaturated acid, anhydride or glycidyl-containing ester, the process comprising:
(a) heating the blend to form a polymer melt;
(b) forcing the blend through one or more dies to form one or more filaments;
(c) stranding the filaments to form a fiber.

2. The process of claim 1 wherein the melt is forced by an extruder through a multi-element die to form multiple filaments, and the multiple filaments are stranded to form a multi-stranded polymer.

* * * * *